UNITED STATES PATENT OFFICE.

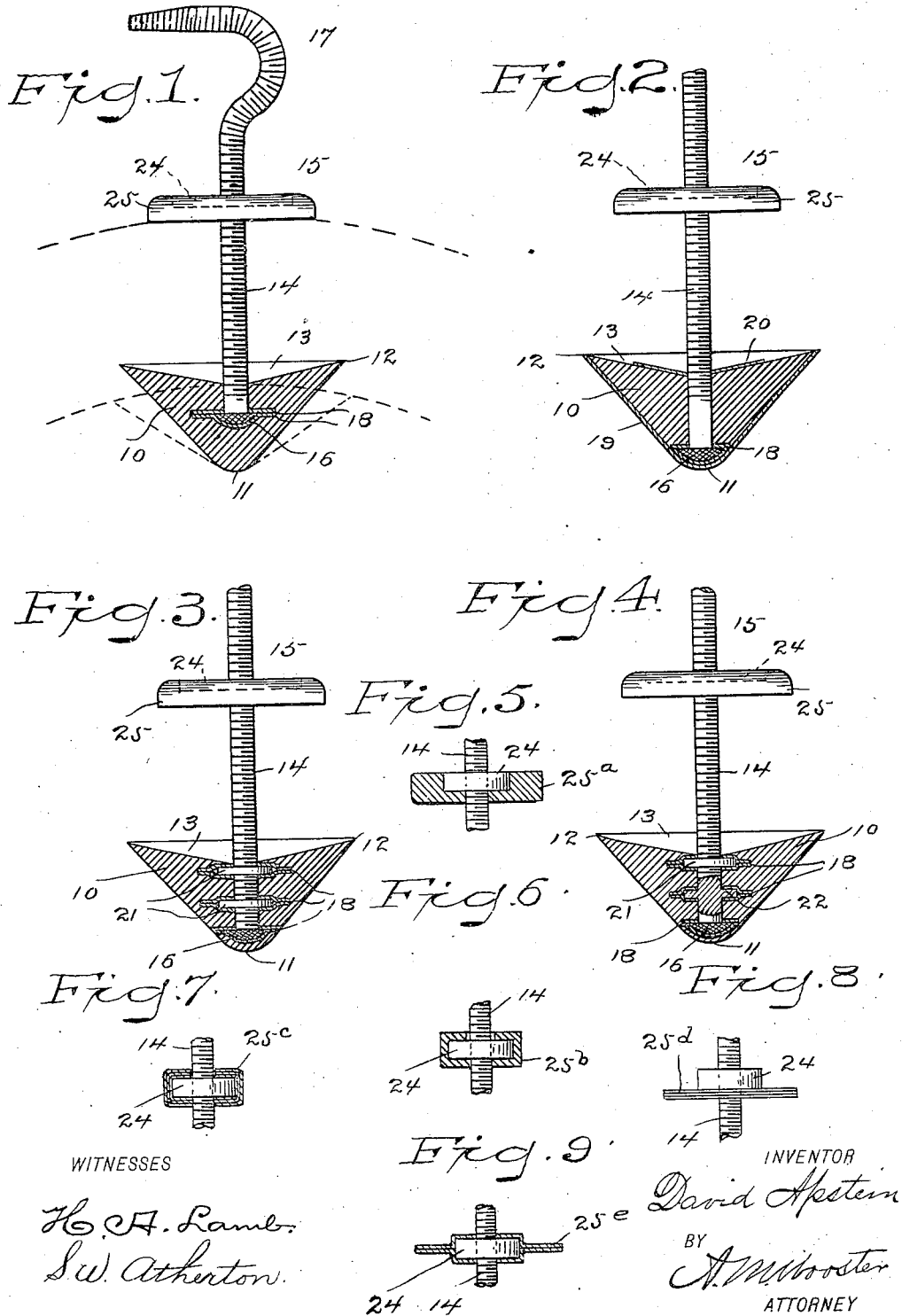

DAVID APSTEIN, OF BRIDGEPORT, CONNECTICUT.

PUNCTURE-CLOSER.

No. 868,242.

Specification of Letters Patent.

Patented Oct. 15, 1907.

Application filed February 11, 1907. Serial No. 356,704.

*To all whom it may concern:*

Be it known that I, DAVID APSTEIN, a citizen of the United States, residing at Bridgeport, county of Fairfield, State of Connecticut, have invented a new and useful Puncture-Closer, of which the following is a specification.

This invention has for its object to provide a simple, easily and quickly operated and inexpensive puncture closer for pneumatic tires.

With this end in view the invention consists essentially in a flexible closer carried by a threaded shank and secured in place after insertion by a nut upon the shank.

The invention consists furthermore in special details of construction which will be hereinafter described and then specifically pointed out in the claims hereunto appended.

In the accompanying drawing forming a part of this specification, Figures 1, 2, 3 and 4 are sectional views on an enlarged scale, illustrating variant forms in which I have carried my invention into effect; and Figs. 5, 6, 7, 8 and 9 are views illustrating variant forms of padded nuts.

10 denotes the closer which is made of soft rubber and has the general configuration of a cone with a rounded point indicated by 11 and a thin edge indicated by 12. The base of the closer is preferably hollowed out, as at 13, rendering the edges thinner and more flexible and adapting the closer to shape itself readily to the concave inner face of a pneumatic tire when drawn to place.

14 denotes the shank which is threaded to receive a nut 15 which is preferably padded. At the inner end of the shank is a head 16. The outer end of the shank may be curved and recurved, as in Fig. 1, to form a hand piece 17 for convenience in operation. The shank is secured to the closer by molding the head therein. In order to lock the closer firmly upon the shank and prevent the possibility of the closer becoming loose on the shank or the shank being pulled out, I preferably roughen head 16 and place patches 18 of textile material on opposite sides thereof, the shank being passed through the patch on the inner side of the head. These patches are secured to each other and to the roughened head by cementing them in place, and when the patches and head are molded into the closer, it is made practically impossible for the closer to become loose on the shank or for the shank to be pulled out of the closer.

In the form illustrated in Fig. 1, I have shown the head of the shank and the patches as molded in at approximately the center of the closer.

In the form illustrated in Fig. 2, the head and patches are molded in at the apex or point of the closer, and as the outer patch is not covered by the rubber of the closer, I provide the closer with an outer covering 19 of textile material which may or may not extend to the base of the closer as in Fig. 2. This outer textile covering renders it impossible for the closer to become detached from the shank in forcing it through a puncture and the additional mass of rubber on the inner side of the head gives greater flexibility to the edge of the closer when it is drawn to place on the inner side of a tire.

20 denotes a covering disk of textile material which may be placed on the base of the closer, the shank passing through the center of the disk. This disk does not extend to the edge of the closer so that the flexibility of the edge is not impaired thereby.

In the form illustrated in Fig. 3, I have shown the closer as additionally secured to the shank by means of collars 21 which are threaded to engage the shank and may be adjusted wherever required. Patches 18 are provided on the opposite sides of these collars the same as on opposite sides of the head, the shank in this instance passing through both of the patches. The form illustrated in Fig. 4 differs only in that in addition to the head an enlargement 22 is formed upon the shank below the head. This enlargement, with patches 18 on opposite sides thereof, is molded into the closer. One or more of these enlargements may be formed on the shank or a single enlargement may be used, the shank being threaded below the enlargement and a collar 21 used or not as preferred. The nut 15 engages the thread of the shank. In order to insure that the nut will not cut or wear the outer face of the tire and to provide that the inner and outer walls of the tire shall be gripped between two non-rigid surfaces, I preferably use a padded nut of one of the forms illustrated in the drawing. This nut comprises a plate 24 of metal and a pad 25 of yielding material secured thereto.

In the form illustrated in Figs. 1 to 5 inclusive, the pad consists of a block or disk of rubber into which the operative face and the edge of plate 24 are molded as clearly shown in Fig. 5, in which the pad or block of rubber is specifically indicated by $25^a$.

In the form illustrated in Fig. 6, the pad is formed from a disk of leather, felt or rubber which is closed over the edge and top of the plate and may or may not be secured to the plate by cement, the pad in this form being specifically indicated by $25^b$.

In the form illustrated in Fig. 7, the pad is formed from disks of textile material, one or more of which are closed over the edge and top of the plate and may or may not be secured thereto by cement or in any suitable manner, the pad in this form being specifically indicated by $25^c$.

In the form illustrated in Fig. 8, the pad consists of a disk or a plurality of disks of any suitable flexible material as cloth, felt, leather or rubber, which are cemented or otherwise secured to the underside of the plate but are not closed over it, the pad in this form being specifically indicated by 25ᵈ.

In the form illustrated in Fig. 9, the pad consists of disks of flexible material made larger than the plate, placed on opposite sides thereof and cemented together at the edges, thus inclosing the plate, the pad in this form being specifically indicated by 25ᵉ.

By making the operative face of the nut flexible and yielding, it is adapted to closely engage the convex outer face of the tire without the slightest danger of cutting or wearing it. I thus provide that the wall of a tire shall be gripped between a thoroughly flexible closer and a padded nut, so that leakage is rendered practically impossible.

In use, the puncture, if it requires it, is enlarged slightly by means of the hand piece or any suitable tool, the nut is withdrawn sufficiently upon the shank and the closer is forced through the puncture and into the tire, the base of the closer being ordinarily covered with cement so as to cause it to adhere to the inner face of the tire. The closer is then drawn tightly against the tire and the nut turned down to place on the shank. After turning the nut down as far as possible, the shank and closer are rotated by means of the hand piece, the nut being held against rotation in order to clamp the walls of the tire more closely between the flexible closer and the padded nut. After the closer and nut are set to place, the portion of the shank outside of the nut is cut or broken off flush with the outer face of the nut.

Having thus described my invention I claim:

1. A device of the character described comprising a flexible closer, a threaded shank to which the closer is secured and a nut on the shank whose operative face and edge are molded into a block of rubber.

2. A device of the character described comprising a cone-shaped flexible closer, a threaded shank having a head, textile patches on opposite sides of the head, said head and said patches being molded into the closer, and a nut on the shank to engage the outer face of a tire.

3. A device of the character described comprising a threaded shank having a head, textile patches on opposite sides of the head, a cone-shaped flexible closer at whose apex the head and patches are molded, and a textile cover 19 on the outer face of the plug.

4. A device of the character described comprising a threaded shank having a head, textile patches on opposite sides of the head, a cone-shaped flexible closer at whose apex the head and patches are molded, a textile cover 19 on the outer face of the closer and a textile covering 20 on the base of the closer.

5. The combination with a flexible closer and a threaded shank to which the closer is secured, of a nut comprising a metal plate engaging the shank and a block of rubber into which the operative face and edge of the plate are molded, so that in use the walls of a tire are gripped between flexible surfaces.

6. The combination with a cone-shaped flexible closer, a threaded shank having a head and textile patches on opposite sides of the head, said head and patches being molded into the closer, of a padded nut comprising a metal plate, engaging the shank and a block of rubber into which the operative face and the edge of the plate are molded.

In testimony whereof I affix my signature, in presence of two witnesses.

DAVID APSTEIN.

Witnesses:
A. M. WOOSTER,
S. W. ATHERTON.